United States Patent
Chou

(10) Patent No.: US 7,362,912 B2
(45) Date of Patent: Apr. 22, 2008

(54) METHOD AND SYSTEM FOR IMMEDIATELY DETERMINING INCORRECT PIXEL VALUES OF A CAPTURED IMAGE

(75) Inventor: Tse-an Chou, Taichung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 646 days.

(21) Appl. No.: 11/067,691

(22) Filed: Mar. 1, 2005

(65) Prior Publication Data

US 2005/0276509 A1    Dec. 15, 2005

(30) Foreign Application Priority Data

Jun. 11, 2004   (TW) .............................. 93116843 A

(51) Int. Cl.
G06K 9/40      (2006.01)
G06F 3/033     (2006.01)

(52) U.S. Cl. ...................... 382/263; 345/166
(58) Field of Classification Search ................ 382/260, 382/263, 275, 313, 321, 324; 345/166, 156, 345/163; 235/472.03, 472.01
See application file for complete search history.

(56) References Cited

U.S. PATENT DOCUMENTS

| | | | |
|---|---|---|---|
| 5,644,139 A * | 7/1997 | Allen et al. ................. | 250/557 |
| 6,281,882 B1 * | 8/2001 | Gordon et al. .............. | 345/166 |
| 6,795,056 B2 * | 9/2004 | Norskog et al. ............ | 345/158 |
| 6,831,628 B1 * | 12/2004 | Farag et al. ................ | 345/157 |
| 6,950,094 B2 * | 9/2005 | Gordon et al. .............. | 345/166 |
| 7,161,582 B2 * | 1/2007 | Bathiche et al. ............ | 345/156 |
| 7,212,685 B2 * | 5/2007 | Park et al. .................. | 382/260 |
| 7,295,186 B2 * | 11/2007 | Brosnan ..................... | 345/166 |
| 7,313,255 B2 * | 12/2007 | Machida et al. ........... | 382/107 |
| 2003/0034959 A1 * | 2/2003 | Davis et al. ................ | 345/166 |
| 2005/0141781 A1 * | 6/2005 | Lin et al. .................... | 382/273 |

\* cited by examiner

Primary Examiner—Andrew W. Johns
Assistant Examiner—Andrae Allison
(74) Attorney, Agent, or Firm—Bacon & Thomas, PLLC

(57) ABSTRACT

A method for immediately determining incorrect pixel values of a captured image on an optical mouse, which determines a quality of an image in a video stream captured by the optical mouse and accordingly finds a motion distance for the optical mouse. The method first computes a set of match values for possible motion vectors of a sample image with respect to a reference image and applies a filtering operation to compute a respective smooth coefficient for each match value. The method further computes a locally minimum number in the set of match values according to a first rule, such that the sample image is regarded as a qualified image when the locally minimum number is smaller than a threshold and accordingly a global minimum in the set of match values is found as a motion vector of the sample image.

20 Claims, 5 Drawing Sheets

METHOD AND SYSTEM FOR IMMEDIATELY DETERMINING INCORRECT PIXEL VALUES OF A CAPTURED IMAGE

BACKGROUND OF THE INVENTION

1. Field of the Invention

The invention relates to a method and system for immediately determining incorrect pixel values of a captured image and, more particularly, to a method and system for immediately determining incorrect pixel values of a captured image on an optical mouse.

2. Description of Related Art

A typical optical mouse has an image sensor. The image sensor consists of a plurality of image sensing elements. Two sequential images sensed by the image sensor are applied for detecting a motion distance of the mouse. Typically, the detection uses a portion of the first image as a search block, thereby computing a correlation of the search block and a same-size block located on the second image at a different location than the one. Accordingly, a smallest absolute value is found as the motion distance.

FIG. 1 shows an example of images in which a motion of an optical mouse is detecting. In FIG. 1, a first image 130 and a second image 110 respectively have a size of 16×16 pixels, and a search block 120 has a size of 8×8 pixels, i.e., an 8×8 image on the center of the first image 130. The center of the 8×8 image is denoted by a cross 'X'. As shown in FIG. 1, the search block after extracted is moved to different directions for computing the correlation with the second image 110. Since motion distance of an optical mouse is associated with the motion speed of the optical mouse operated by a user. The first image 130 is typically no more than 4 pixels different from the second image 110. Thus, when computing the correlation between the search block 120 and the second image 110, the center of the search block 120 is respectively located at each circle, as denoted by an 'O', of the second image 110 and accordingly the correlation between the search block 120 and the second image 110 is computed. Thus, in this case, eighty-one values C1-C81 are produced to represent the correlation between the search block 120 and the second image 110. Upon the 81 values C1-C81, a respective displacement point having the optimal correlation can be found to determine the motion distance.

However, for typical algorithms used in an optical mouse, since patterns or contaminants on a mouse pad can cause a captured image to have incorrect pixel values, the incorrect pixel values may cause an estimated error as performing a motion vector estimation, and the estimated error can be accumulated to thus affect the accuracy on the motion vector estimation. Therefore, it is desirable for the above optical mouse to be improved, so as to mitigate and/or obviate the aforementioned problems.

SUMMARY OF THE INVENTION

The object of the invention is to provide a method and system for immediately determining incorrect pixel values of a captured image, which can increase the accuracy on the motion vector estimation.

According to a feature of the invention, there is provided a method for immediately determining incorrect pixel values of a captured image on an optical mouse, which determines a quality of an image in a video stream captured by the optical mouse and accordingly finds a motion distance for the optical mouse. The method includes a reference image capturing step, a sample image capturing step, a match value computing step, a smooth coefficient computing step, a locally minimum number computing step, and an image quality determining step. The reference image capturing step captures an image as a reference image from the video stream. The sample image capturing step captures an image after the reference image for use as a sample image. The match value computing step computes a set of match values for possible motion vectors of the sample image with respect to the reference image. The smooth coefficient computing step applies a filtering operation to compute a respective smooth coefficient for each match value. The locally minimum number computing step computes a locally minimum number in the set of match values according to a first rule. The image quality determining step determines if the locally minimum number is smaller than a threshold; if yes, the sample image is a qualified image and next a global minimum in the set of match values is found as a motion vector of the sample image.

According to another feature of the invention, there is provided a system for immediately determining incorrect pixel values of a captured image on an optical mouse, which determines a quality of an image in a video stream captured by the optical mouse and accordingly finds a motion distance for the optical mouse. The system includes a light source, a pixel array, an analog to digital converter (ADC) and a controller. The light source illuminates a sampling plane. The pixel array consists of plural image sensing elements to capture images from the sampling plane, thereby forming the video stream. The ADC is coupled to the pixel array for converting the video stream into digital signals. The controller is coupled between the light source and the ADC for controlling their timing, such that the controller captures an image as a reference image from the video stream, captures an image after the reference image for use as a sample image, computes a set of match values for possible motion vectors of the sample image with respect to the reference image, applies a filtering operation to compute a respective smooth coefficient for each match value, computes a locally minimum number in the set of match values according to a first rule, and determines if the locally minimum number is smaller than a threshold; if yes, the sample image is a qualified image and thus a global minimum in the set of match values is found as a motion vector of the sample image.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
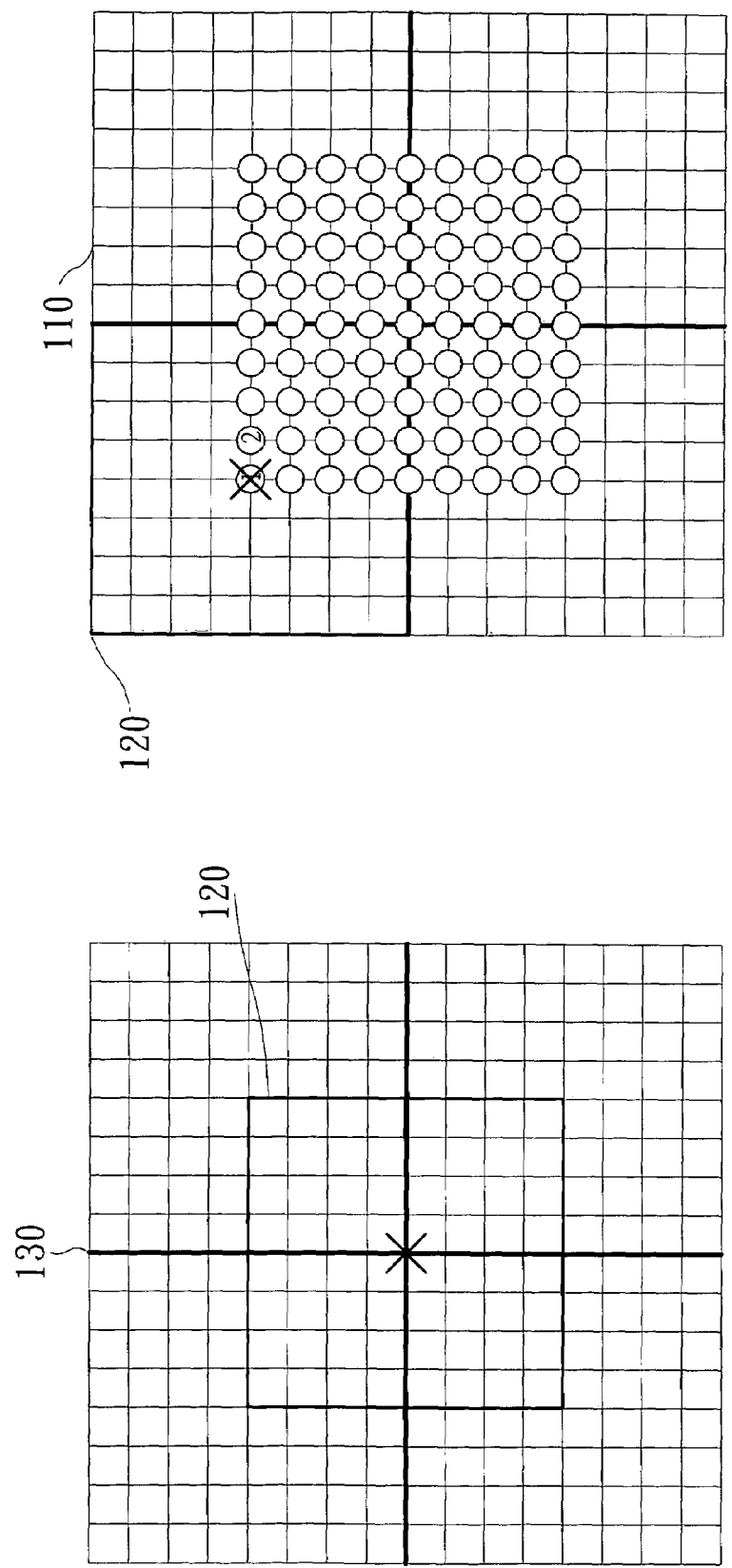
FIG. 1 is a schematic diagram of a typical correlation computation.
Figure 2:
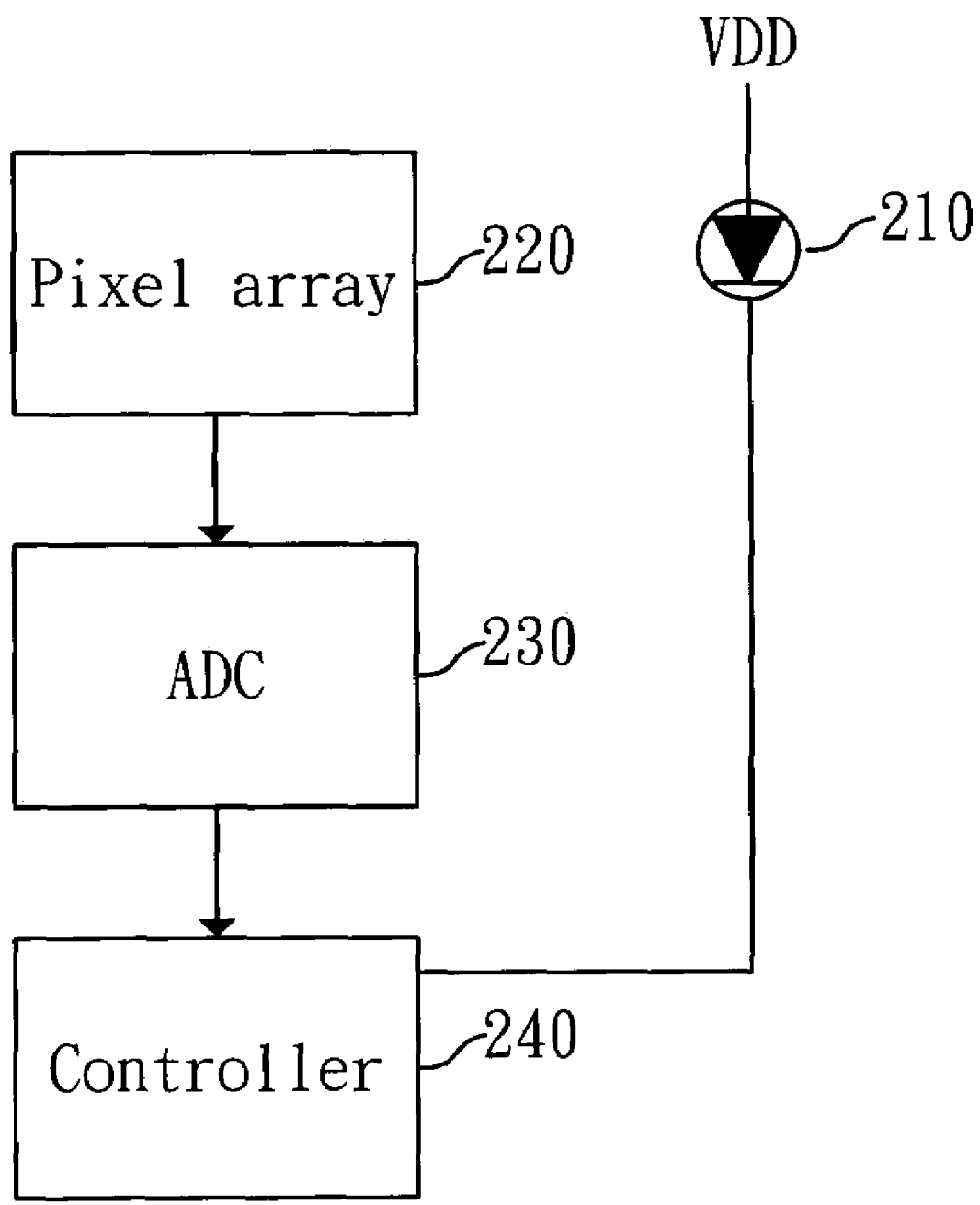
FIG. 2 is a block diagram of a system for immediately determining incorrect pixel values of a captured image according to the invention.

FIG. 2 is a schematic diagram of a system for immediately determining incorrect pixel values of a captured image according to the invention, which, with reference to FIG. 1, applies a video stream with a first image 130 and a second image 110 for determining if the second image 110 is a qualified image when locating a motion vector associated with a block 120 of a first image 130 in a second image 110. If the second image 110 is a qualified image, the respective motion vector is outputted; otherwise, a preset motion vector is outputted. The system includes a light source 210, a pixel array 220, an analog to digital converter (ADC) 230 and a controller 240.

The light source 210 illuminates a sampling plane. Preferably, the light source 210 is a light-emitting diode (LED). The pixel array 220 consists of plural image sensing elements to capture images from the sampling plane, thereby forming the video stream. The ADC 230 is connected to the pixel array 220 for converting the video stream into digital signals. The controller 240 is coupled between the light source 210 and the ADC 230 for controlling their timing for illumination and conversion respectively.

Figure 3:
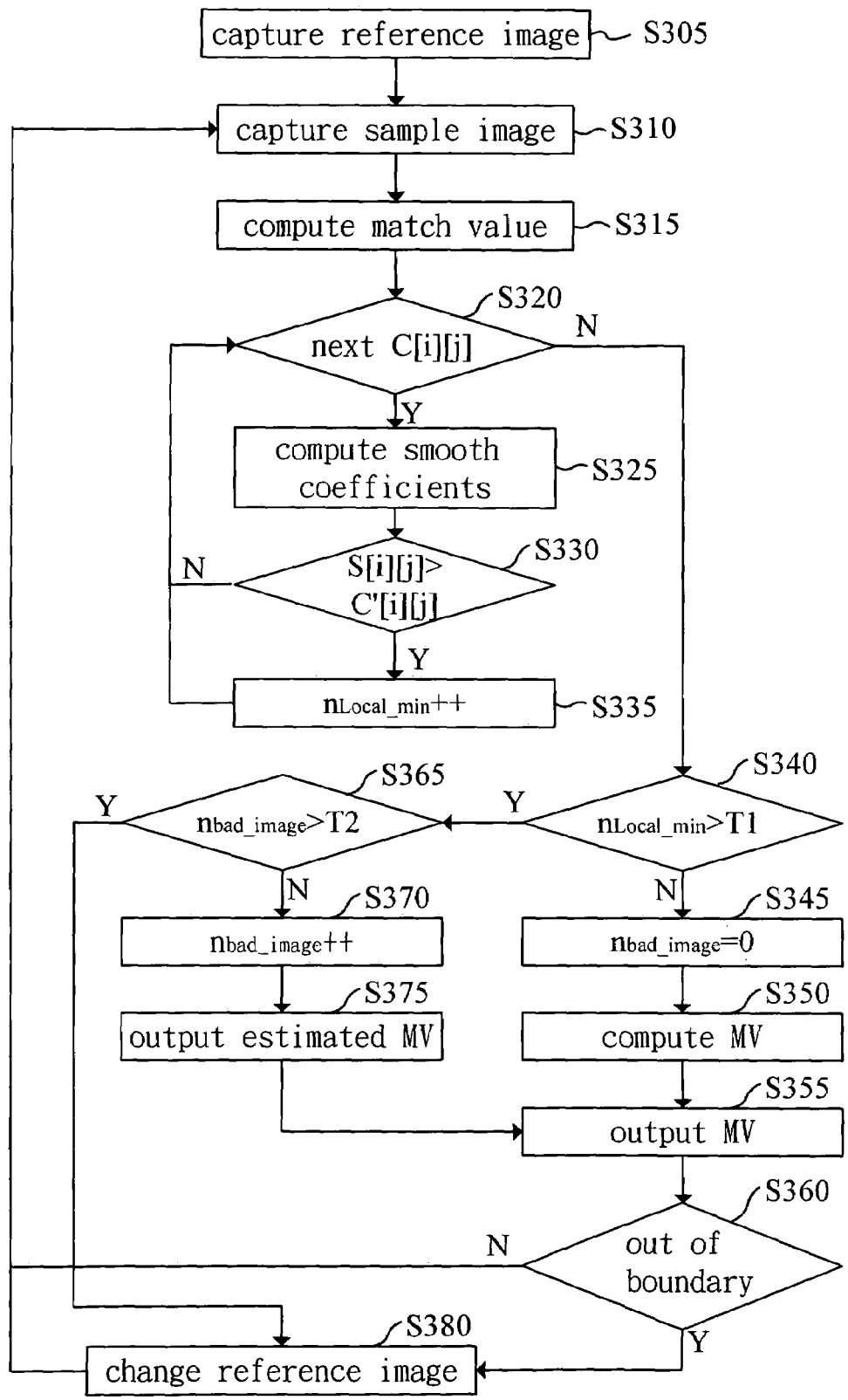
FIG. 3 is a flowchart of a method for immediately determining incorrect pixel values of a captured image according to the invention.

FIG. 3 is a schematic diagram of a method for immediately determining incorrect pixel values of a captured image according to the invention, which applies a video stream with a first image 130 and a second image 110, as shown in FIG. 1, for determining if the second image 110 is a qualified image when locating a motion vector associated with a block 120 of the first image 130 in the second image 110. If the second image 110 is a qualified image, the respective motion vector is outputted; otherwise, a preset motion vector is outputted.

As shown in FIG. 3, step S305 captures an image as a reference image from the video stream. In this embodiment, a first image 130 is captured as the reference image. Step S310 then captures a second image after the reference image as a sample image. In this embodiment, the second image 110 is captured as the sample image.

Step S315 computes a set of match values for possible motion vectors of the reference image. In this embodiment, similar to FIG. 1, the set of match values C[i][i] is obtained as follows. The center of the search block 120 is located separately at each circled position, as denoted by an 'O' in the second image 110, and then the respective correlation between the search block 120 and the second image 110 is computed. In this case, the second image 110 has eighty-one circled positions, and thus the center of the search block 120 is located eighty-one times. Accordingly, eighty-one correlation values, i.e., the set of match values C[i][j], are obtained after eighty-one correlation computations, where $1 \leq i \leq 9$, $1 \leq j \leq 9$, and i, j are integers.

Steps S320 to S335 compute smooth coefficients for the set of match values C[i][j] and find a locally minimum number in the set of match values C[i][j] according to a first rule. Step S320 determines if all smooth coefficients are computed completely; if yes, step S340 is executed; otherwise, step 325 is executed.

Step S325 applies a filtering operation to compute a respective smooth coefficient S[i][j] for each match value C[i][j]. The filtering operation is a high pass filtering, which performs inner product of each match value C[i][j] plus its neighbors and a high pass matrix to thus obtain a respective smooth coefficient S[i][j]. The high pass matrix can be a 3×3 matrix as [0 1 0;1 n 1;0 1 0], where n is a constant smaller than zero, in this case, n=−4.

Step S330 determines if the smooth coefficient S[i][j] is greater than a corrected match value C40 [i][j]. If the smooth coefficient S[i][j] is greater than a corrected match value C'[i][j], it indicates that the match value C[i][j] is a local minimum, so step S335 is executed to add a locally minimum number by 1 (variable $n_{Local\_min}$++), wherein the locally minimum number represents a number of match values C[i][j] that are a local minimum. If the smooth coefficient S[i][j] is not greater than a corrected match value C'[i][j], step S320 is executed. The first rule is provided to multiply the match value C[i][j] by a correct factor G, thereby obtaining a respective corrected match value C'[i][j], where G is a constant greater than zero, in this case, G=2. Therefore, the match value C[i][j] can be determined as a local minimum when the smooth coefficient S[i][j] is greater than the corrected match value C'[i][j].

Step S340 is an image quality determining step, which determines if the locally minimum number (variable $n_{Local\_min}$) is smaller than a first threshold T1. If the locally minimum number (variable $n_{Local\_min}$) is smaller than a first threshold T1, it indicates that the sample image (the second image 110) is a qualified image, so step S345 is executed to reset the number of non-qualified sample images to zero ($n_{bad\_image}$=0). Thus, step 350 finds a global minimum in the set of match values C[i][j] as a motion vector of the sample image.

In step S340, if the locally minimum number (variable $n_{Local\_min}$) is not smaller than a first threshold T1, it indicates that the sample image (the second image 110) is a non-qualified image, so step S365, which is a reference image determining step, is executed to determine if the number of non-qualified sample images ($n_{bad\_image}$) is smaller than a second threshold T2. If the number of bad sample images ($n_{bad\_image}$) is not smaller than a second threshold T2, it indicates that the sample image (the first image 130) can be the reference image, so step S370 is executed to add the number of non-qualified sample images by 1 ($n_{bad\_image}$++) and output a preset motion vector as the motion vector of the sample image (step S375).

Step S355 selects the motion vector generated in step S350 or S375 as the motion vector of the sample image for output.

Step S360 determines if the motion vector output is over a boundary of the reference image. If the motion vector output is over a boundary of the reference image, it indicates that the reference image (the first image 130) cannot be the reference image, so a reference image changing step (step S380) is executed to use a current sample image as a current reference image. If the motion vector output is not over a boundary of the reference image, it indicates that the reference image (the first image 130) can be the reference image, so step S310 is executed.

In step S365, if the number of non-qualified sample images ($n_{bad\_image}$) is smaller than the second threshold T2, it indicates that the sample image (the first image 130) cannot be the reference image, so the reference image changing step (step S380) is executed.

Figure 4A:
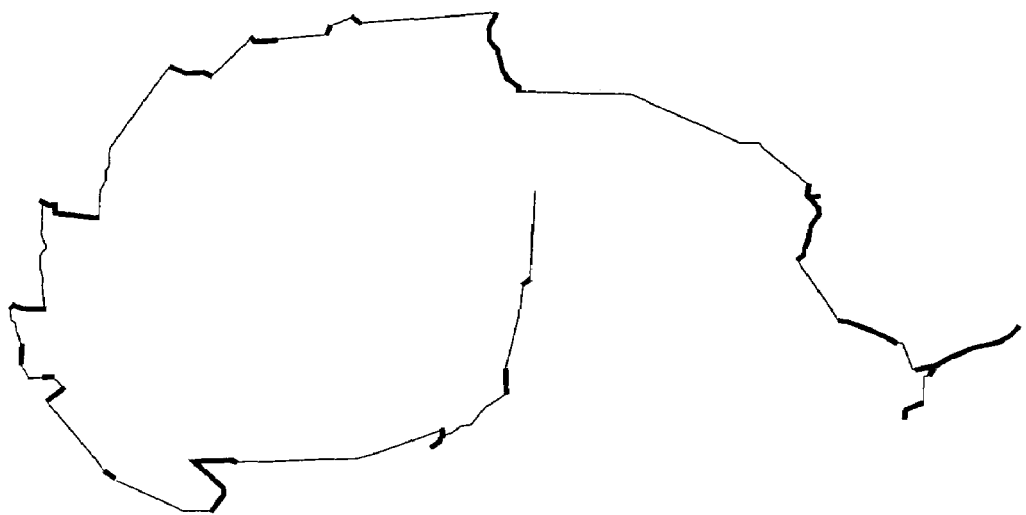
FIG. 4A is a schematic graph of a motion vector computed when a typical optical mouse is used to draw a circle on a mouse pad.
Figure 4B:
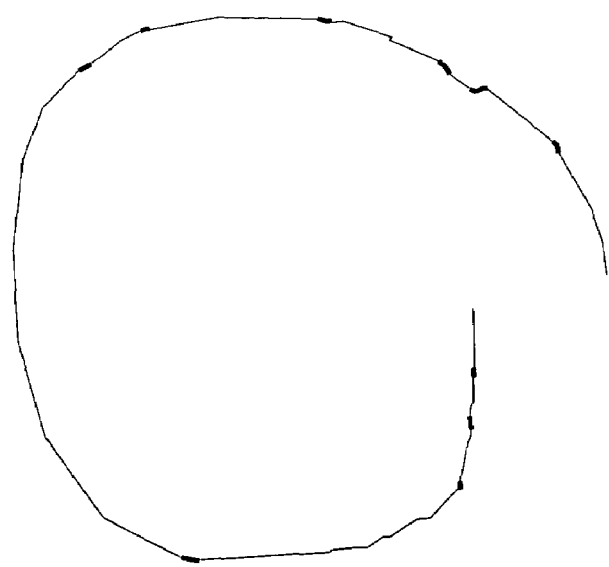
FIG. 4B is a schematic graph of a motion vector computed when an optical mouse is used to draw a circle on the mouse pad of FIG. 4A according to the invention.
Figure 5A:
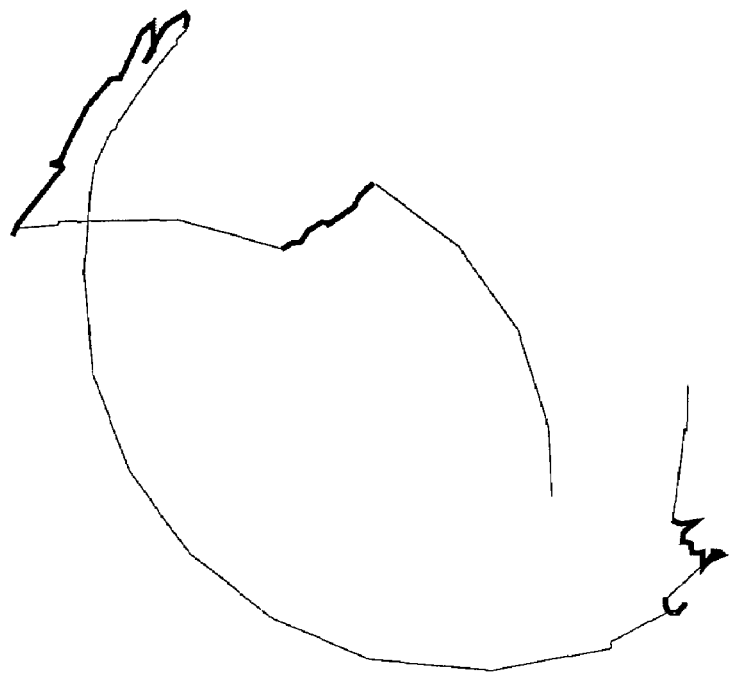
FIG. 5A is a schematic graph of a motion vector computed when a typical optical mouse is used to draw a circle on another mouse pad.
Figure 5B:
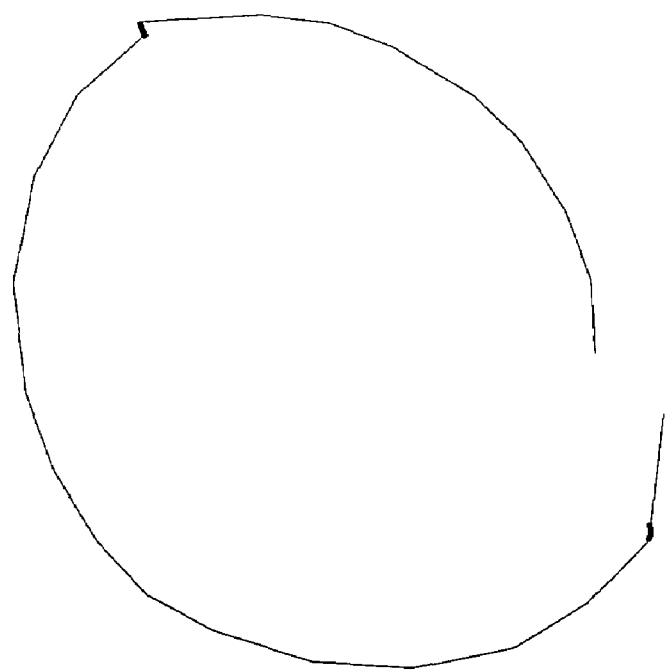
FIG. 5B is a schematic graph of a motion vector computed when an optical mouse is used to draw a circle on the mouse pad of FIG. 5A according to the invention.

For typical algorithms used in an optical mouse, patterns or contaminants on a mouse pad can cause a captured image to have incorrect pixel values which may further affect the accuracy on the motion vector estimation. As shown in FIG. 4A, when a typical optical mouse is used to draw a circle on a mouse pad, the motion vector actually computed by the typical optical mouse is not a circle due to the cited affection. FIG. 4B shows the motion vector computed when an invented optical mouse is used to draw a circle on the mouse pad. FIG. 5A shows the motion vector computed when the typical optical mouse is used to draw a circle on another mouse pad. FIG. 5B shows the motion vector computed when the invented optical mouse is used to draw a circle on the mouse pad of FIG. 5A. As compared to FIGS. 4A and 4B, as well as FIGS. 5A and 5B, the invention adds a step that determines if the sample image is a qualified image, which can increase the accuracy in computing the motion vector by means of the sample image.

Although the present invention has been explained in relation to its preferred embodiment, it is to be understood that many other possible modifications and variations can be made without departing from the spirit and scope of the invention as hereinafter claimed.

What is claimed is:

1. A method for immediately determining incorrect pixel values of a captured image on an optical mouse, which determines a quality of an image in a video stream captured by the optical mouse and accordingly finds a motion distance for the optical mouse, the method comprising the steps:
    a reference image capturing step, which captures an image as a reference image from the video stream;
    a sample image capturing step, which captures an image after the reference image for use as a sample image;
    a match value computing step, which computes a set of match values for possible motion vectors of the sample image with respect to the reference image;
    a smooth coefficient computing step, which applies a filtering operation to compute a respective smooth coefficient for each match value;
    a locally minimum number computing step, which computes a locally minimum number in the set of match values according to a first rule; and
    an image quality determining step, which determines if the locally minimum number is smaller than a first threshold; if yes, the sample image is a qualified image and thus a global minimum in the set of match values is found as a motion vector of the sample image.

2. The method as claimed in claim 1, wherein in the image quality determining step, if the locally minimum number is not smaller than the first threshold, the sample image is a non-qualified image and thus a preset motion vector is used as the motion vector of the sample image.

3. The method as claimed in claim 2, further comprising a reference image changing step, which changes the reference image when a number of non-qualified sample images are over a second threshold.

4. The method as claimed in claim 3, wherein the number of non-qualified sample images is a number of successively non-qualified sample images.

5. The method as claimed in claim 3, wherein the reference image is changed into a current sample image.

6. The method as claimed in claim 1, wherein the first rule is to multiply each match value by a correct factor to thus obtain a respective corrected match value, and if the corrected match value is smaller than a respective smooth coefficient, the match value is a local minimum.

7. The method as claimed in claim 6, wherein the correct factor is a constant greater than zero.

8. The method as claimed in claim 1, wherein in the smooth coefficient computing step, the filtering operation is a high pass filtering.

9. The method as claimed in claim 8, wherein the high pass filtering performs an inner product of each match value plus its neighbors and a high pass matrix to thus obtain a respective smooth coefficient, where the high pass matrix is a 3×3 matrix as [0 1 0;1 n 1;0 1 0].

10. The method as claimed in claim 9, wherein n is a constant smaller than zero.

11. A system for immediately determining incorrect pixel values of a captured image on an optical mouse, which determines a quality of an image of a video stream captured by the optical mouse and accordingly finds a motion distance for the optical mouse, the system comprising:
    a light source, which illuminates a sampling plane;
    a pixel array, which consists of plural image sensing elements to capture images from the sampling plane, thereby forming the video stream;
    an analog to digital converter (ADC), which is connected to the pixel array for converting the video stream into digital signals; and
    a controller, which is coupled between the light source and the ADC for controlling their timing,
    wherein the controller captures an image as a reference image from the video stream, captures an image after the reference image for use as a sample image, computes a set of match values for possible motion vectors of the sample image with respect to the reference image, applies a filtering operation to compute a respective smooth coefficient for each match value, computes a locally minimum number in the set of match values according to a first rule, and determines if the locally minimum number is smaller than a first threshold; if yes, the sample image is a qualified image and thus a global minimum in the set of match values is found as a motion vector of the sample image.

12. The system as claimed in claim 11, wherein if the controller determines that the locally minimum number is not smaller than the first threshold, the sample image is a non-qualified image and thus a preset motion vector is used as the motion vector of the sample image.

13. The system as claimed in claim 12, wherein if the controller determines that a number of non-qualified sample images are over a second threshold, the controller changes the reference image.

14. The system as claimed in claim 13, wherein the number of non-qualified sample images is a number of successively non-qualified sample images.

15. The system as claimed in claim 13, wherein the reference image is changed into a current sample image.

16. The system as claimed in claim 11, wherein the first rule is to multiply each match value by a correct factor to thus obtain a respective corrected match value, and if the corrected match value is smaller than a respective smooth coefficient, the match value is a local minimum.

17. The system as claimed in claim 16, wherein the correct factor is a constant greater than zero.

18. The system as claimed in claim 11, wherein in the smooth coefficient computing step, the filtering operation is a high pass filtering.

19. The system as claimed in claim 18, wherein the high pass filtering performs an inner product of each match value plus its neighbors and a high pass matrix to thus obtain a respective smooth coefficient, where the high pass matrix is a 3×3 matrix as [0 1 0;1 n 1;0 1 0].

20. The system as claimed in claim 19, wherein n is a constant smaller than zero.

* * * * *